United States Patent [19]

Wilkes

[11] Patent Number: 4,964,314

[45] Date of Patent: Oct. 23, 1990

[54] DEVICE FOR CONVERTING ROTARY MOTION TO LINEAR MOTION

[76] Inventor: Donald F. Wilkes, 937 Bobcat Blvd., NE., Albuquerque, N. Mex. 87122

[21] Appl. No.: 322,010

[22] Filed: Mar. 13, 1989

[51] Int. Cl.[5] ............................................. F18H 1/16
[52] U.S. Cl. .......................... 74/424.8 C; 74/424.8 R
[58] Field of Search .................................. 74/424.8 C

[56] References Cited

U.S. PATENT DOCUMENTS

| | | | |
|---|---|---|---|
| 1,903,053 | 3/1933 | Kuba | 74/424.8 C |
| 2,831,363 | 4/1958 | Lohr . | |
| 2,924,112 | 2/1960 | Martens . | |
| 2,951,390 | 9/1960 | Martens et al. . | |
| 2,966,070 | 12/1960 | Wise . | |
| 2,966,071 | 12/1960 | Wise . | |
| 2,974,539 | 3/1961 | Martens . | |
| 3,003,362 | 10/1961 | Martens . | |
| 3,004,445 | 10/1961 | Mondon . | |
| 3,014,379 | 12/1961 | Wise . | |
| 3,164,029 | 1/1965 | Martens . | |
| 3,173,304 | 3/1965 | Strandgren . | |
| 3,214,991 | 11/1965 | Perrin . | |
| 3,226,809 | 1/1966 | Perrin . | |
| 3,595,094 | 7/1971 | Lemor . | |
| 3,726,151 | 4/1973 | Lemor . | |
| 3,884,090 | 5/1975 | Dock . | |
| 4,048,867 | 9/1977 | Saari . | |
| 4,050,319 | 9/1977 | Stanley . | |
| 4,074,586 | 2/1978 | Nussbaum . | |
| 4,576,057 | 3/1986 | Saari . | |
| 4,665,100 | 4/1987 | Frederick et al. . | |

FOREIGN PATENT DOCUMENTS 0737687  6/1980  U.S.S.R. .......................... 74/424.8 C

Primary Examiner—Joseph Falk
Assistant Examiner—Gerald A. Anderson
Attorney, Agent, or Firm—Burns, Doane, Swecker & Mathis

[57] ABSTRACT

An apparatus for converting rotary motion to linear motion includes a centrally located screw member and a concentrically positioned outer member that surrounds the screw member but is spaced therefrom in order to define an annular space between the outer member and the screw member. A plurality of planet assemblies are positioned around the screw member and within the annular space. Each planet assembly is comprised of a roller that has a plurality of annular grooves extending circumferentially around its exterior surface. Each pair of adjacent grooves define a ridge therebetween whereby each roller has a plurality of spaced annular ridges extending circumferentially around its exterior surface. The ridges on the rollers engage the helical thread on the screw member as well as annular grooves on the inner surface of the outer member. The outer diameter of the planet assemblies is at least equal to the outside diameter of the screw member. Further, a planet assembly carrier can be provided for holding the planet assemblies and for maintaining the planet assemblies in a symmetrical arrangement around the screw member.

15 Claims, 6 Drawing Sheets

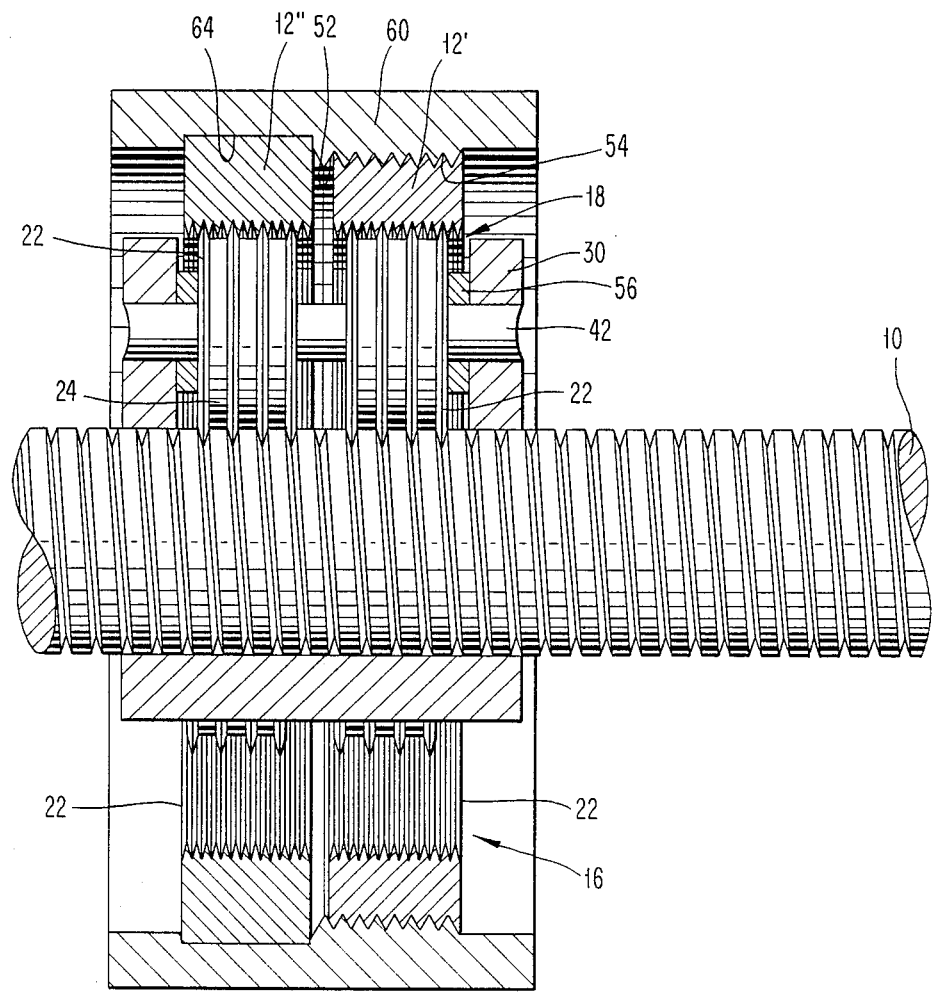

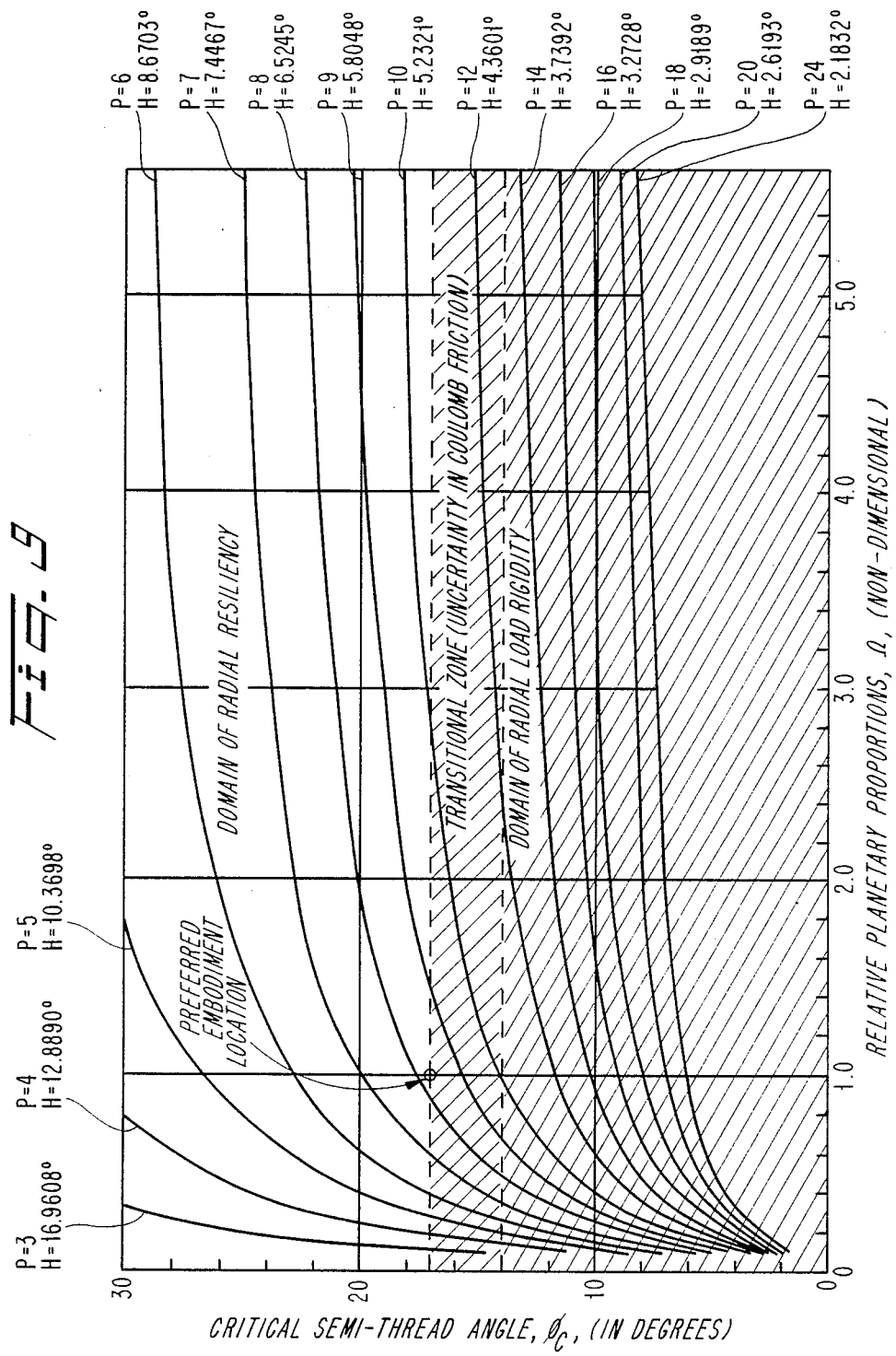

DEVICE FOR CONVERTING ROTARY MOTION TO LINEAR MOTION

BACKGROUND OF THE INVENTION

The present invention relates to an apparatus for converting one type of motion to another type of motion, and more particularly, to an apparatus for converting rotary motion to linear motion.

The prior art has employed various types of apparatuses and arrangements for converting rotary motion to linear motion. One type of arrangement includes a plurality of roller members that surround a centrally located and externally threaded screw. The roller members have flanges that extend radially outward from the exterior surface thereof and which engage the thread on the outer surface of the screw. Further, a ring encircles the roller members and the screw whereby the roller members are positioned between the screw and the ring. Prior art apparatuses similar to that described above are disclosed in U.S. Pat. Nos. 4,048,867, 4,050,319, 4,576,057, 3,884,090 and 4,655,100.

However, the prior art assemblies described above fail to take into account the relationship between the outer diameter of the screw and the outer diameter of the roller members and the affect that relationship has on the bearing stresses produced in the screw assembly. Since the bearing stress in the screw assembly affects the performance and operation of the screw assembly, the relationship between the diameter of the screw and the diameter of the roller members should be taken into consideration when designing the screw assembly.

The prior art screw assemblies also fail to consider the affect that the canted load bearing surfaces of the screw, the roller members and the ring have on the behavior of the screw assembly. In that respect, the prior art does not recognize that the canted load bearing surfaces of the various rotating parts of the screw assembly tend to produce an effective radius for each of the rotating parts that is larger than the respective actual radii. Thus, the prior art does not realize that the rolling parts behave as though they have larger radii of curvature.

OBJECTS AND SUMMARY OF THE INVENTION

The aforementioned disadvantages in the prior art are overcome through the interrelationship between the various elements of the present invention which includes a longitudinally extending and externally threaded screw member and a plurality of planet assemblies that surround the screw member. In one preferred embodiment, three screw assemblies are symmetrically located around the screw member and each of the screw assemblies is comprised of a roller that has a plurality of annular grooves extending circumferentially around the exterior surface thereof. Each pair of adjacent grooves on the roller defines an annular ridge therebetween that extends circumferentially around the exterior surface of the roller. An outer member encircles the planet assemblies and a plurality of evenly spaced annular grooves extend around the interior surface of the outer member and engage the ridges on the roller. The ridges extending from the rollers contact the helical thread on the screw member and the annular grooves on the inner surface of the outer member. A planet assembly carrier is provided for maintaining the position of the planet assemblies. The planet assembly carrier includes a centrally located bore through which the screw member extends and a plurality of cut-out portions which extend radially inward from the side surfaces of the carrier towards the centrally located bore. The cut-out portions of the planet assembly carrier communicate with the centrally located bore so that when the planet assemblies are mounted in the cut-out portions, the ridges which extend from the roller in each planet assembly engage the helical thread on the screw member.

In another preferred embodiment, each of the planet assemblies comprises two separate rollers, each of which has a plurality of annular grooves and annular ridges on its exterior surface. One outer member encircles one of the rollers and another outer member encircles the other roller. Each of the outer members has annular grooves on its interior surface for engaging with the annular ridges extending from the respective rollers. An outer member holder is provided for encircling both outer members and the outer member holder can be provided with a helical thread on a portion of its interior surface or on its entire interior surface. The exterior surface of one or both of the outer members can be provided with helical threads for engaging with the helical threads on the outer member holder. In that way, one or both of the outer members can be axially adjusted with respect to the outer member holder to thereby permit the planet assembly to be preloaded.

In the preferred embodiments, the ratio of the diameter of the planet members to the diameter of the screw member is equal to or greater than one and the thread cone semi-angle is less than twenty degrees and is preferably equal to about seventeen degrees.

BRIEF DESCRIPTION OF THE DRAWINGS

FIG. 4 is a horizontal sectional view taken along the line 4—4 of FIG. 3.

FIG. 5 is a perspective view of the planet assembly carrier of the present invention.

FIG. 6 is a horizontal sectional view similar to FIG. 4 showing another embodiment of the present invention.

FIG. 9 is a graph showing the relationship between the planetary proportions and the semi-thread critical angle for various screw assemblies.

DETAILED DESCRIPTION OF THE PREFERRED EMBODIMENTS

Figure 1:
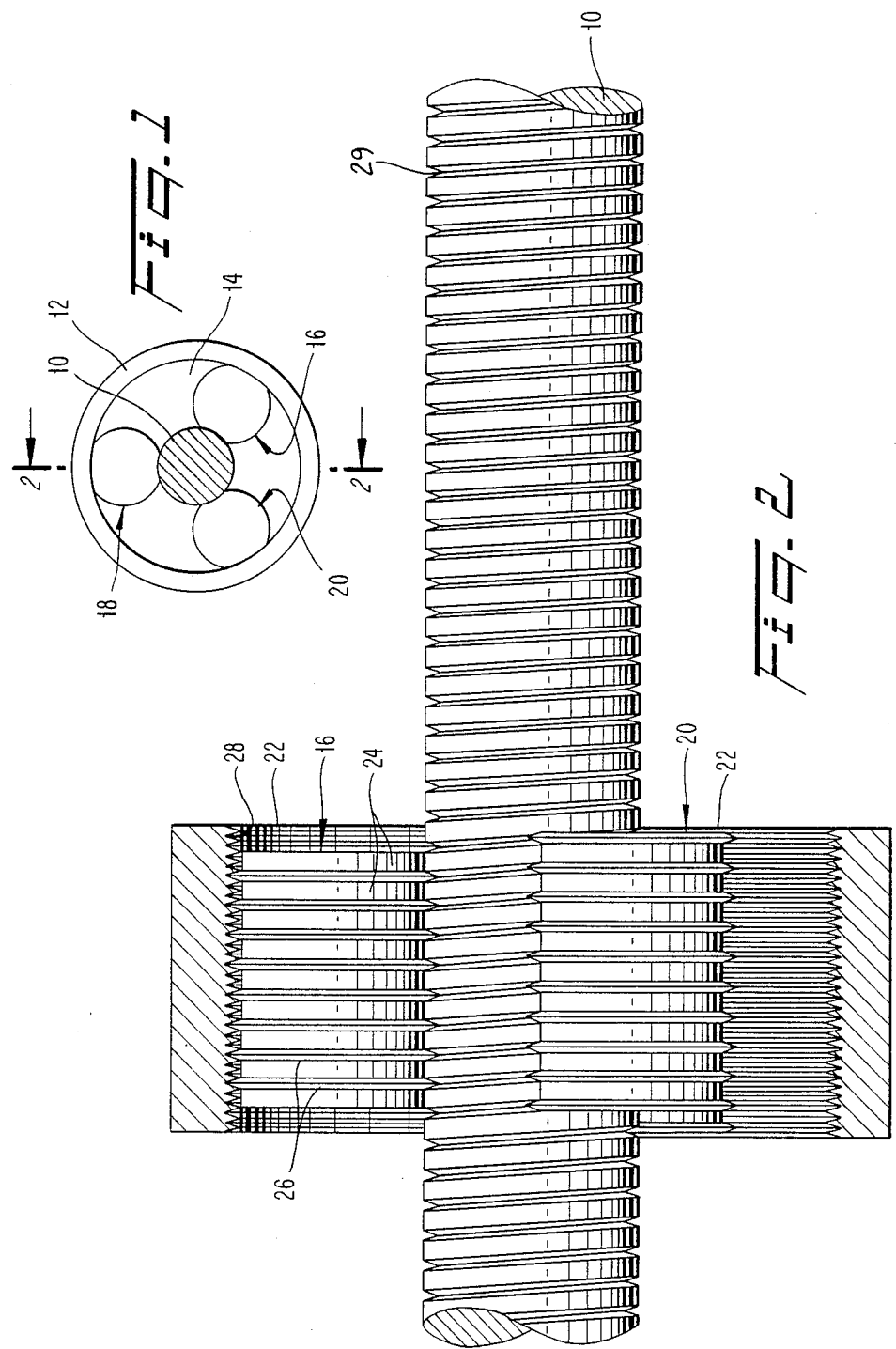
FIG. 1 is an end view of the apparatus of the present invention.

Referring initially to FIG. 1, a preferred embodiment of the present invention includes a centrally located screw member 10 and an outer member 12. The screw member 10 is helically threaded on its exterior surface. The outer member 12 surrounds the screw member 10 and extends along a portion of the length of the screw member 10. The outer member 12 is concentrically positioned with respect to the screw member 10 and is spaced from the screw member 10 to thereby define an annular space 14 between the inner surface of the outer member 12 and the outer surface of the screw member 10. A plurality of planet assemblies 16, 18, 20 are positioned within the annular space 14. As depicted in the preferred embodiment of FIG. 1, three planet assemblies, 16, 18, 20 are positioned between the screw member 10 and the outer member 12 and the three planet assemblies 16, 18, 20 are symmetrically positioned around the screw member 10 as viewed from an end of the screw member 10.

Figure 2:
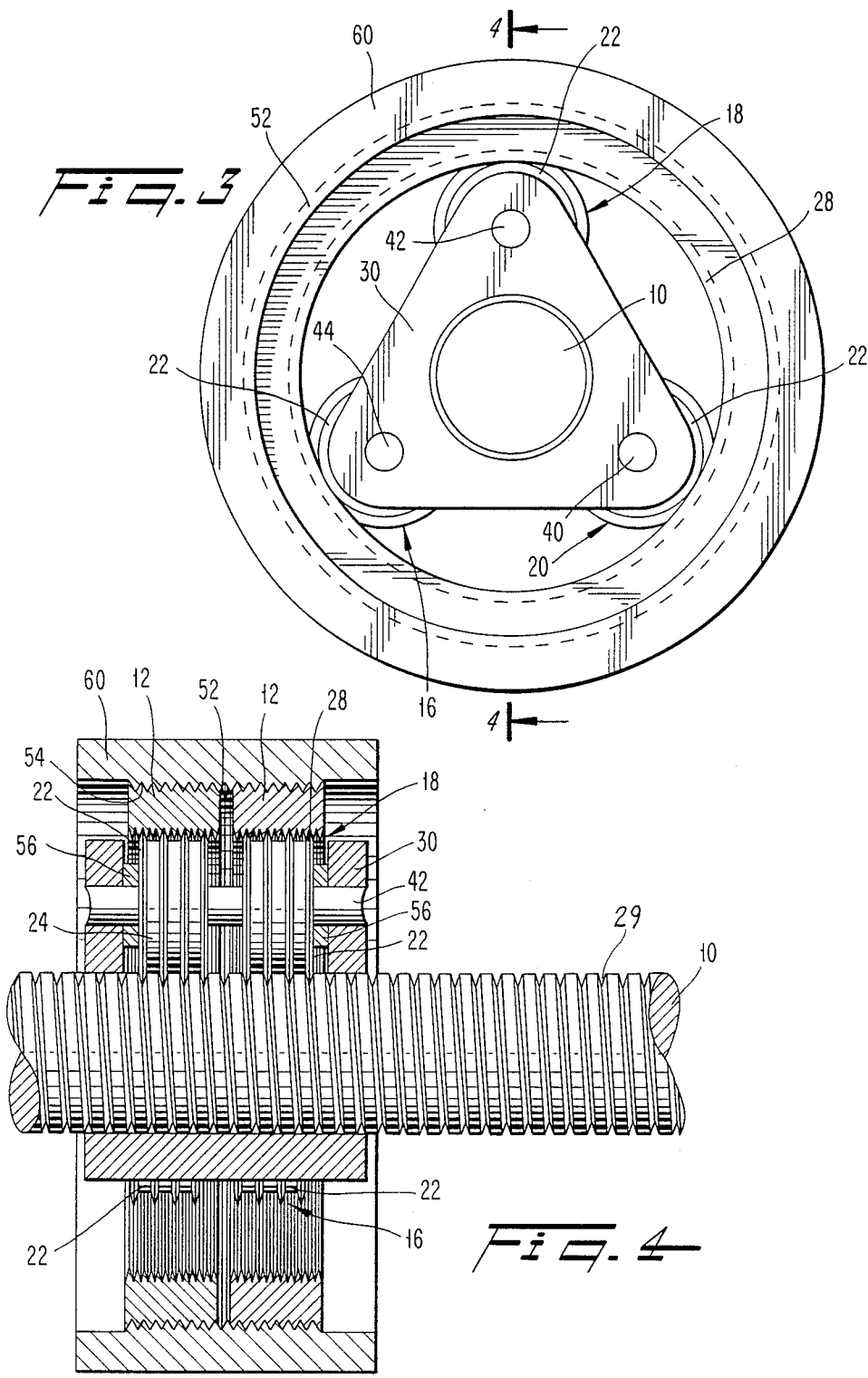
FIG. 2 is a horizontal sectional view taken along the line 2—2 of FIG. 1.

With reference to FIG. 2, each of the planet assemblies 16, 18, 20 comprises a roller 22 that has a plurality of spaced annular grooves 24 which extend circumferentially around its entire exterior surface. Each of the planet assemblies further includes a plurality of ridges 26 that extend from the roller 22. Each pair of adjacent grooves 24 defines a ridge 26 therebetween. Each of the ridges 26 lies in a plane that is perpendicular to the axis of the respective planet assembly 16, 18, 20 and that is perpendicular to the longitudinal axis of the screw member 10. Each of the ridges 26 on each planet assembly 16, 18, 20 tapers to a point from the base of the grooves 24.

A plurality of evenly spaced, annular grooves 28 are provided on the inner surface of the outer member 12. Each of the grooves 28 extends around the entire inner surface of the outer member 12. Each ridge 26 which extends from the rollers 22 engages both the helical thread 29 on the screw member 10 and a corresponding annular groove 28 on the inner surface of the outer member 12. Movement of the planet assemblies 16, 18, 20 and the outer member 12 along the length of the screw member 10 can be effected by fixing the outer member 12 to prevent its rotation and rotating the screw member 10. In some applications, it may be desirable to rotationally fix the screw member 10 while rotating the outer member 12.

In a preferred embodiment of the present invention, the screw member 10 is provided with a single lead helical thread on its outer surface. In such an embodiment, the planet assemblies 16, 18, 20 must be axially staggered with respect to the longitudinal axis of the screw member 10 in order that the ridges 26 which extend from the rollers 22 properly engage the helical thread 29 on the screw member 10. Specifically, the planet assemblies 16, 18, 20 are axially staggered to define a leading planet assembly 16, a middle planet assembly 18, and a trailing planet assembly 20. In the embodiment illustrated in FIG. 2, the leading planet assembly 16 is axially advanced with respect to both the middle planet assembly 18 and the trailing planet assembly 20. The leading planet assembly 16 is axially advanced with respect to the middle planet assembly 18 by a distance equal to one-third of the lead of the helical thread of the screw member 10. Similarly, the middle planet assembly 18 is axially advanced with respect to the trailing planet assembly 20 by a distance equal to one-third of the lead of the helical thread of the screw member 10.

In order to accommodate and accurately position the axially staggered planet assemblies 16, 18, 20 within the outer member 12, the inner surface of the outer member 12 includes at least three times as many equally spaced grooves 28 as there are ridges 26 on any one of the rollers 22. Each of the grooves 28 on the inner surface of the outer member 12 is spaced apart from the adjacent groove 28 by a distance equal to one-third of the distance between the ridges 26 on the rollers 22.

It is envisioned that the preferred embodiment of the present invention as depicted in FIGS. 1 and 2 could include a triple lead helically threaded screw member 10. If three planet assemblies 16, 18, 20 were employed in conjunction with the triple lead helically threaded screw member 10, there would be no need to axially stagger the planet assemblies 16, 18, 20. In such an arrangement, similarly positioned ridges on each of the rollers 22 would be arranged in the same plane, thereby requiring the same number of annular grooves 28 on the inner surface of the outer member 12 as there are ridges 26 on any one of the rollers 22. It will be understood that arrangements other than those described above could be employed depending upon the load carrying requirements of the apparatus, the mechanical advantage desired and the efficiency sought. Thus, for example, a multiple lead screw member 10 could be employed in conjunction with more than three planet assemblies.

Figure 3:
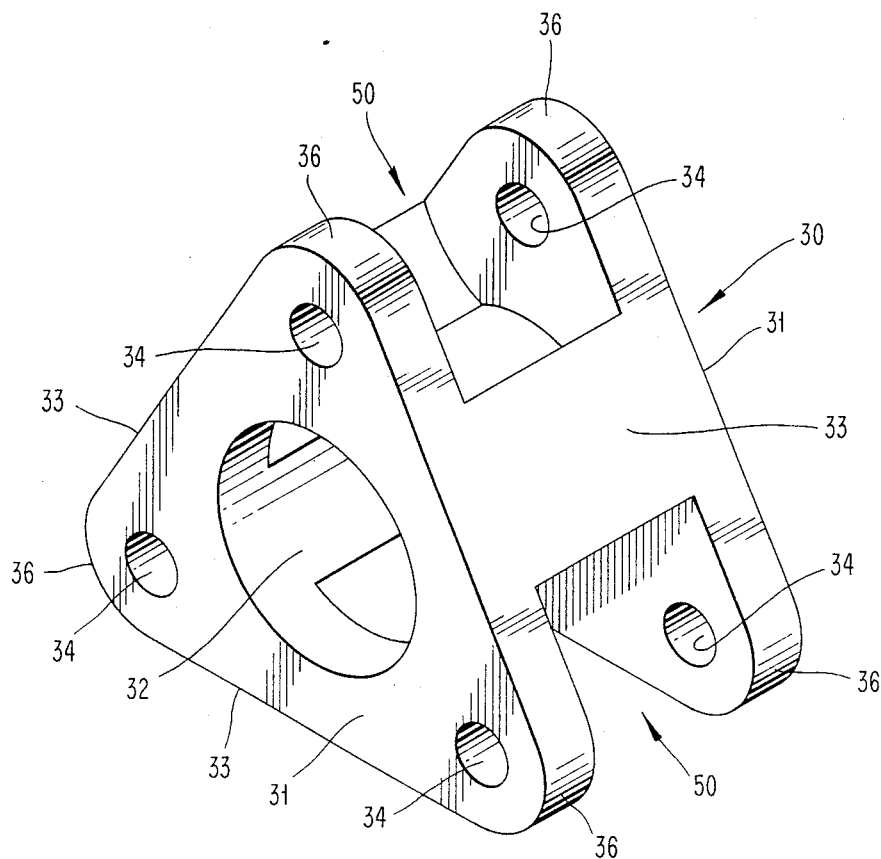
FIG. 3 is an end view of another embodiment of the present invention.

Referring to FIGS. 3 and 4, another preferred embodiment of the present invention will be described. Reference numerals similar to those used above in FIGS. 1 and 2 will be used to describe like elements. With reference initially to FIG. 3, the screw assembly includes a centrally located screw member 10 that is helically threaded on its outer surface. A plurality of planet assemblies 16, 18, 20 are symmetrically disposed around the screw member 10. In the preferred embodiment, three planet assemblies 16, 18, 20 are provided and each of the planet assemblies 16, 18, 20 is rotatably positioned around its own centrally located planet shaft 40, 42, 44 respectively. The longitudinal axes of the planet shafts 40, 42, 44 are parallel to each other and to the longitudinal axis of the screw member 10.

As best illustrated in FIG. 4, each of the planet assemblies 16, 18, 20 comprises two separate rollers 22. Thus, planet assembly 16 comprises two separate rollers 22, planet assembly 18 comprises two separate rollers 22, and planet assembly 20 comprises two separate rollers 22. The two separate rollers 22 in planet assembly 20 cannot be seen in FIG. 4. Each of the rollers 22 associated with each of the planet assemblies 16, 18, 20 has a plurality of equally spaced, annular grooves 24 located on the exterior surfaces thereof. The exterior surface of each roller 22 includes a plurality of equally spaced annular frustoconical ridges 26 defined by the adjacent grooves 24. Each of the ridges 26 tapers to an end from the base of the groove 24 and lies in a plane that is perpendicular to the longitudinal axis of the respective planet shaft 40, 42, 44 and the longitudinal axis of the screw member 10.

In order to maintain the planet assemblies 16, 18, 20 in their symmetrical arrangement, a planet carrier 30 is provided. The planet carrier 30 (see FIG. 5) includes a generally triangularly shaped member (which is appropriate for a three member planet assembly) that has a centrally located bore 32 extending therethrough. The centrally located bore 32 extends through the carrier 30 from one face 31 of the carrier 30 to the opposite face 31 of the carrier 30. The triangular shape of the carrier 30, as viewed from one of the faces 31, is defined by the side surfaces 33. The diameter of the bore 32 is slightly larger than the outer diameter of the screw member 10 to thereby receive the screw member 10.

At each corner of the generally triangular shaped planet carrier 30, a portion 50 of the carrier 30 is cut-out to receive a corresponding one of the planet assemblies 16, 18, 20 described above. Each cut-out portion 50 extends from the adjacent side surfaces 33 toward the central bore 32 and communicates with the central bore 32. The cut-out portions 50 have an axial length which is less than the length of the carrier 30 so that flanges 36 are formed on either side of each cut-out portion 50.

Each of the flanges 36 has a hole 34 formed therein. With respect to each pair of oppositely positioned flanges, the hole 34 in one flange 36 is coaxially aligned with the hole 34 in the other flange 36 in that pair. Further, the longitudinal axis of each one of the holes 34 is parallel to the longitudinal axis of the central bore 32. The holes 34 are adapted to receive the planet shafts 40, 42, 44 associated with each of the planet assemblies 16, 18, 20. Each of the cut-out portions 50 directly communicates with the central bore 32 so that when the planet assembly 16, 18, 20 is positioned in the corresponding cut-out portion 50 and the screw member 10 is positioned in the central bore 32, the ridges 26 on each of the rollers 22 engage the helical thread 29 on the screw member 10. This relationship is accomplished by spacing the axis of the holes 34 from the axis of the bore 32 by a distance which is less than the sum of (a) the screw flight crest radius of the screw member 10 and (b) the radius of the tip of the frustoconical ridges 26.

Although FIG. 5 shows the planet carrier assembly 30 as being triangular, it will be understood that such an arrangement is suitable for use with a screw assembly that employs three planet members. A planet carrier assembly having a different configuration will, of course, be utilized when more than three planet members are employed.

When multiple rollers 22 are used in the planet assemblies (see FIG. 4), the planet assemblies 16, 18, 20 can be preloaded by providing two adjustable outer members 12, 12. The inner surface of each adjustable outer member 12 is provided with annular grooves 28 which engage the ridges 26 on the corresponding roller 22. The two outer members 12 can each be provided with any desirable adjusting device for moving the outer members 12, 12 in an axial direction to thereby introduce preloading to the planet assemblies 16, 18, 20. By operating the adjusting device associated with the outer members 12 the outer members 12 can be moved axially inwardly towards one another or moved axially outwardly away from each other. In that way, the interfaces between the screw member 10 and the planet assemblies 16, 18, 20 and the interfaces between the planet assemblies 16, 18, 20 and the outer members 12, 12 can be made as tight or as loose as desired, depending upon the particular application.

The preferred embodiment (FIG. 4) also includes an outer member holder 60. The outer member holder 60 has internal threads 52 on its interior surface for engaging with threads 54 on the exterior surface of the outer members 12, 12. The outer members 12 can have external threads of opposite hand, i.e. one left handed and the other right handed. Thus, by providing cooperating threads on the holder 60, rotation of the holder 60 will axially preload the outer members 12 by moving them relative to one another.

Two planet assembly centering washers 56 are positioned on the planet shaft 42 associated with the middle planet assembly 18 only. One of the washers 56 is located on the planet shaft 42 at one end of the middle planet assembly 18 and the other washer 56 is positioned on the planet shaft 42 at the opposite end of the middle planet assembly 18. On the other planet assemblies, both washers are located at the same end of the shaft, i.e. both on the right end for one, both on the left end for the other. With that arrangement, the washers space the assemblies axially relative to one another when the washer axial thickness is one third of the screw lead.

In another preferred embodiment (FIG. 6) a helically threaded screw member 10 and a plurality of planet assemblies 16, 18, 20 are also provided. Each of the planet assemblies 16, 18, 20 is comprised of two separate rollers 22 which are rotatably mounted on respective planet shafts 40, 42, 44. Each roller 22 has a plurality of spaced annular grooves 24 and ridges 26 located on its exterior surface. A planet assembly carrier 30, similar to that illustrated in FIG. 5, is also provided for mounting the planet assemblies 16, 18, 20 and for maintaining them in a symmetrical arrangement around the screw member 10. In the above respects, this preferred embodiment (FIG. 6) is similar to the embodiment illustrated in FIG. 4.

The two outer members 12', 12" of this embodiment and an outer member holder 60 are, however, slightly different. The outer member holder 60 encloses the outer members 12', 12" to thereby position the outer members 12', 12" between the planet members and the outer member holder 60. A portion of the interior surface of the outer member holder 60 is provided with a helical thread 52 while the remaining portion 64 of the interior surface of the outer member holder 60 has no helical thread.

Both of the outer members 12', 12" have annular grooves 28 located on the interior surface thereof to engages the annular frustoconical ridges 26 which extend from the rollers 22. One of the outer members 12' is helically threaded on its exterior surface to engage the conforming helical thread 52 on the interior surface of the outer member holder 60. In that way, the one outer member 12' can be axially moved with respect to both the outer member holder 60 and the other outer member 12", when the holder 60 is rotated. The other outer member 12" has no helical threads on its exterior surface and that outer member 12" is fixedly secured to a portion 64 of the outer member holder 60 that has no threads. Thus, the other outer member 12" cannot move axially relative to the outer member holder 60. A suitable adjusting device (not shown) can be associated with the outer member 12' to rotate it so that the outer member 12' and the associated rollers that are threadedly engaged therewith can be preloaded. The arrangement illustrated in FIG. 6 permits preloading to be applied to the apparatus while at the same time providing a means for locking the preload setting.

Figure 8:
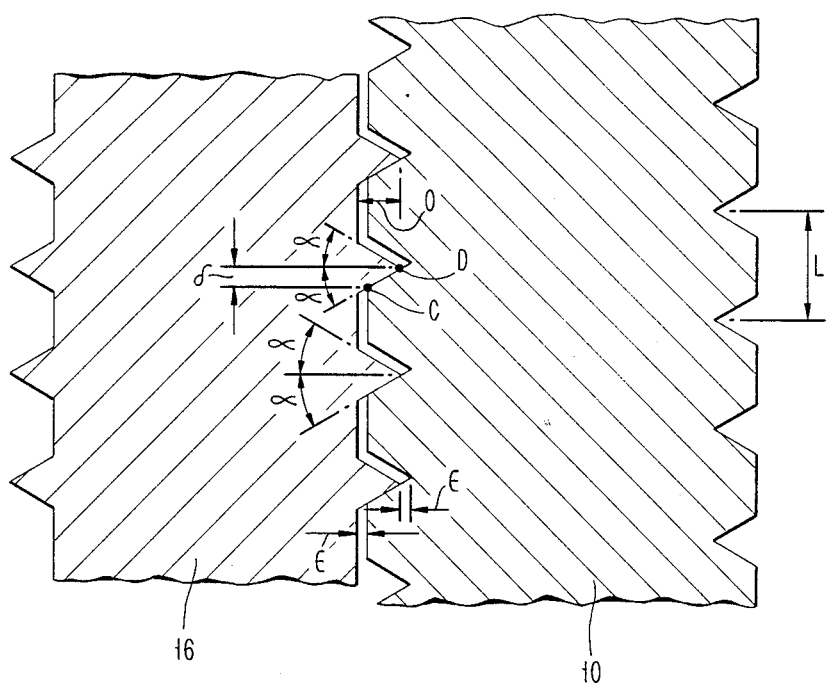
FIG. 8 is a cross-sectional view of the screw member and one of the planet members along the line 8—8 of FIG. 7.

In the various preferred embodiments illustrated, each of the ridges 26 which extends from the rollers 22 is defined by side surfaces that taper toward one another to an edge that engages the helical thread 29 on the screw member 10 and the annular grooves 28 on the outer member 12 (see FIG. 8). The angle formed between the two tapering side surfaces comprises a first angle. Each of the annular grooves 28 on the inner surface of the outer members 12, 12', 12" is defined by converging side surfaces that engage the tapering side surfaces that define the ridges 26. The angle between the converging side surfaces comprises a second angle which is substantially the same as the first angle. In the preferred embodiments described above, the thread angle of the helically threaded screw member 10 is preferably substantially equal to the above-described first and second angles.

It will be understood that the various preferred embodiments of the present invention will include lubricant seals and containment wipers for the purpose of excluding particulate contamination and to thereby maintain the smooth operation of the screw assembly of the present invention. Such seals and wipers could be carried by disk members which would be attached to the outer members 12 or the outer member holder 60.

While the embodiment illustrated in FIGS. 1 and 2 is not shown as including a planet assembly carrier 30 for holding the planet assemblies 16, 18, 20 and for maintaining them in a symmetrical arrangement with respect to the screw member 10, it is to be understood that the embodiment illustrated in FIGS. 1 and 2 could be provided with a planet assembly carrier 30 similar to that depicted in FIG. 5.

As in the FIGS. 1 and 2 embodiment, the embodiments illustrated in FIGS. 3, 4 and 6 employ a single lead helically threaded screw member 10 and three axially staggered planet assemblies 16, 18, 20. Further, the outer members 12, 12', 12" are provided with a sufficient number of equally spaced grooves on the interior surface thereof to accommodate the axially staggered planet assemblies 16, 18, 20.

Depending upon the particular application of the screw assembly, the screw member 10 could have a multiple lead helical thread and more than three planet assemblies could be employed. Moreover, since the number of ridges extending from each of the rollers affects the total load which can be carried by the screw assembly, the number of ridges extending from each of the rollers can be varied depending upon the load carrying requirements of a particular application. Also, when planet assemblies having at least two rollers are employed, the number of ridges extending from each roller in the same planet assembly need not be the same. Instead, the number of ridges extending from each roller in the same planet assembly can be different depending upon the amount of load that must be carried in either axial direction.

While it is possible to employ varying numbers of planet members, it should be realized that there is a limit to the number of planet members that can be employed in a given screw assembly. That limit is based on the relationship in diameter between the screw member 10 and the planet members 16, 18, 20. It can be easily seen that given a particular screw member and a particular set of planet members having a given diameter, there is a limit on the number of planet members that can be positioned around the screw member before the screw members begin contacting one another.

The mechanical advantage of the screw assembly of the present invention is, at least in part, related to the pitch radius helix angle of the screw thread. As the pitch radius helix angle of the screw thread is decreased, the mechanical advantage can thereby be increased. Accordingly, it is desirable to utilize a finely threaded screw having a larger pitch.

However, in decreasing the screw assembly to increase the mechanical advantage, consideration must also be given to the fact that, as the frustoconical surfaces of the ridges 26 on the planet members 16, 18, 20, move across the helical thread of the screw member 10, there is the possibility that binding could occur between the frustoconical surfaces of the ridges 26 and the surface of the helical thread.

For no binding to occur between the frustoconical surfaces of the planet member and the helical surfaces of the screw, a point on the maximum circumference of the frustoconical surface must move circumferentially out of the way of a point directly below that point but on the helical screw flight as that lower point is elevated by rotation of the screw.

Figure 7:
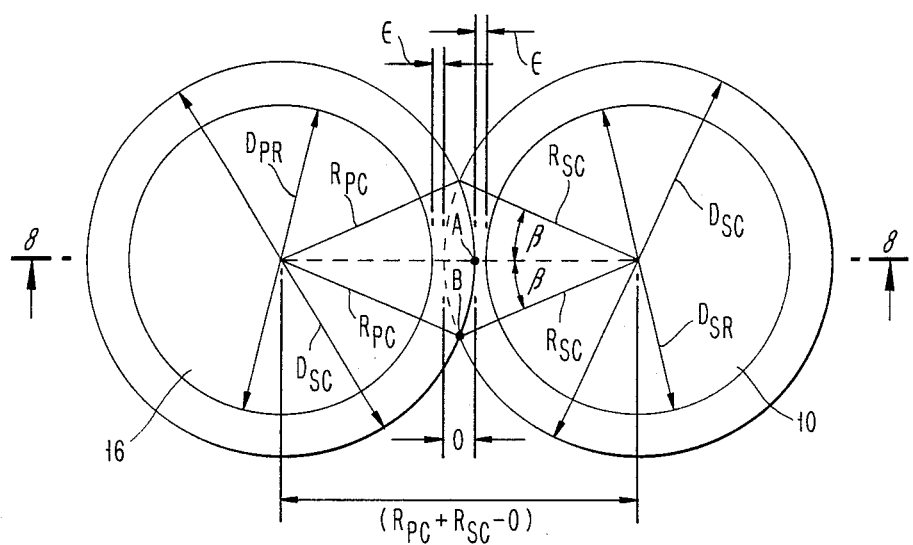
FIG. 7 is an enlarged cross-sectional view showing some of the geometrical relationships that exist between the screw member and one of the planet members.

In terms of the drawings (FIG. 7), as the point A on the frustoconical surface moves circumferentially to the location of point B, the point C (FIG. 8) on the crest of the screw thread moves axially along the screw to the elevation of the point D. For no binding to occur, either the point A moves circumferentially farther than the point B or the point C does not rise to the level of point D.

Stated differently, the thread cone semi-angle, has a critical value, phi, at which binding will just occur. That relationship can be expressed as follows:

$$\tan\alpha = \tan\phi_c = \frac{\delta}{o - 2\epsilon}$$

where alpha is the thread cone semi-angle, $phi_c$ is the critical value where binding is incipient, o is the radial overlap between the projecting edge of the frustoconical surface and the projecting crest of the screw flight, epsilon is the distance between the maximum diameter of one member and the root diameter of the cooperating member, and delta is the axial distance between the screw crest (c) and the ridge crest (D).

In terms of the geometry of the device, it can be seen that the condition of no binding is met where $$\frac{\delta}{L} = \frac{\beta}{2\pi}$$

Thus, the critical value of the cone semi-angle can be expressed as follows:

$$\tan\phi_c = \beta \frac{L}{2\pi(o - 2\epsilon)}$$

Now an expression for the angle beta will be developed in terms of the geometry of the system. From the cosine law, it can be shown that $$\cos\beta = \frac{R_{sc}^2 + (R_{pc} + R_{sc} - o)^2 - R_{pc}^2}{2R_{sc}(R_{pc} + R_{sc} - o)}$$

where $R_{sc}$ is the radius of the screw crest, $R_{pc}$ is the radius of the planet crest, and o is the radial overlap between the projecting edge of the frustoconical surface and the projecting crest of the screw flight.

Geometric characteristics of the system can be nondimensionalized by the radius of the screw crest, $R_{sc}$, so that the following terms can be defined:

$$\Omega = \frac{R_{pc}}{R_{sc}}$$

$$o^* = \frac{o}{R_{sc}}$$

Substituting eq. [3] and eq. [4] into eq. [2], rearranging and simplifying gives the following expression:

$$\beta = \mathrm{acos}\left[\frac{2(1 + \Omega)(1 - o^*) + o^{*2}}{2(1 + \Omega - o^*)}\right]$$

The other geometric parameters of the system can also be non-dimensionalized by the radius of the screw crest as follows:

$$L^* = \frac{L}{R_{sc}}$$

$$\epsilon^* = \frac{\epsilon}{R_{sc}}$$

Using these new definitions, eq. [1] can be expressed in non-dimensional terms as:

$$\tan\phi_c = \frac{\beta L^*}{2\pi(o^* - \epsilon^*)}$$

When the expression for beta (eq. 5) is substituted in eq. 8, the resulting equation can be solved to give the critical cone semi-angle in terms of geometric characteristics of the system as follows:

$$\phi_c =$$

$$\mathrm{atan}\left\{\frac{L^*}{o^* - \epsilon^*} \cdot \frac{1}{2\pi} \mathrm{acos}\left[\frac{2(1 + \Omega)(1 - o^*) + o^{*2}}{(1 + \Omega - o^*)}\right]\right\}$$

Thus the condition of no binding between the frustoconical ridges of the planet members and the helical flight of the screw member is met when the cone semi-angle, alpha, is greater than the critical cone semi-angle, phi$_c$.

In addition to the condition of no binding, it is also necessary that there be radial adjustability between the planet member and the screw. The planet and the screw will have radial adjustability if there is no friction locking between the planet and the screw. Friction locking between the planet member and the screw member is a function of the type of material from which the screw member and planet member are made and generally speaking, the friction locking angle is approximately equal to 14–15 degrees. This condition of no friction locking will be met, therefore, when the cone semi-angle also exceeds the friction locking angle of 15 degrees. In order to provide some additional amount of radial adjustability between the screw member and the planet member and to further permit the use of an adjusting device as described above for preloading the screw assembly, the cone semi-angle should be about 20 degrees and preferably 17 degrees.

To summarize, the cone semi-angle must exceed the larger of (a) the friction locking angle of 15 degrees and (b) the critical cone semi-angle necessary to avoid binding.

The relationship between the critical semi-thread angle and the relative planetary proportions for various types of screws is graphically presented in FIG. 9. It can be seen that the shaded area of the graph represents an area where friction-locking will occur, i.e., where the semi-thread angle is less than approximately 14 degrees. In the differently shaded area between approximately 14–15 degrees and 17 degrees, there is a transition zone where the friction-locking ability of the screw assembly is somewhat uncertain and dependent upon the material from which the planet members and the screw member are manufactured. Finally, the non-shaded area represents the domain of radial resiliency where friction-locking will not occur. In that area, the adjustment means described above can be employed to preload the screw assembly.

The bearing stress between the screw members 10 and the planet members 16, 18, 20 in the above-described embodiments can be advantageously reduced by increasing the diameter of the planet members 16, 18, 20 relative to the diameter of the screw member 10. When the diameter of the planet members 16, 18, 20 is increased relative to the diameter of the screw member 10, the bearing force between the contacting surfaces of the planet members and the screw member 10 can be spread over a larger area, thereby reducing the bearing stress. The bearing force can be spread over a larger area as a result of the fact that larger diameter planet members 16, 18, 20 have larger radii of curvature. Thus, a larger portion of the surfaces of the frustoconical ridges 26 on the planet members 16, 18, 20 are able to contact and bear against the surfaces at the base of the helical thread on the screw member 10. Consequently, the bearing force is distributed over a larger area and the resulting bearing stress is thereby reduced.

From the above discussion, it can be seen that increasing the ratio of the diameter of the planet member 16, 18, 20 to the diameter of the screw member 10 will help reduce the bearing stress between the screw member 10 and the planet numbers. Further, increasing the ratio of the diameter of the planet members 16, 18, 20 to the diameter of the screw member 10 has the added advantage of permitting a larger load to be carried by the screw assembly.

In all of the above-described embodiments, the surfaces that define the helical thread 29 on the screw member 10, the surfaces that define the frustoconical ridges 26 on the planet members 16, 18, 20 and the surfaces that define the annular groove 28 on the inner surface of the outer member 12 are all inclined or canted with respect to a vertical plane perpendicular to the rotational axis of the respective member. The surfaces are canted or inclined with respect to the line of action of the primary load forces. As a result of the inclination, the canted surfaces will have effective radii that are larger than the actual radii of the respective members.

Assuming the surfaces defining the annular grooves 28 on the inner surface of the outer member 12 and the surfaces defining the frustoconical ridges 26 on the planet members 16, 18, 20 are all inclined at the same angle, the angle of inclination of each of the surfaces will be equal to the thread cone semi-angle, phi. The effective radius of each of the canted surfaces is a function of the angle of inclination, phi, and is equal to the average actual pitch radius of the respective surface zone of contact as measured from the rotational axis of that surface, divided by the sine of the thread cone semi-angle, phi. Thus, it can be seen that as the cone semi-angle becomes smaller and smaller, the effective radius will become larger. Moreover, as the effective radius becomes larger, the respective rotating members will exhibit characteristics of a rotating member that has a larger radius than its actual radius. For example, by decreasing the thread cone semi-angle, the screw member and the planet members will behave as though their radii of curvature are larger than they actually are, and consequently, the bearing stresses will be reduced.

Thus, the bearing stress in the contact area between the planet members 16, 18, 20 and the screw member 10 can be reduced not only by increasing the ratio of the diameter of the planet members 16, 18, 20 relative to the diameter of the screw member but, in addition, can be reduced by making the thread cone semi-angle as small as possible within the aforementioned limits defined by the binding and friction locking conditions.

In the preferred embodiments described above, all of the planet assemblies have the same outer diameter to thereby maintain a stable and balanced arrangement. The outer diameter of the planet assemblies is preferably equal to or greater than the outer diameter of the screw member 10 in order to take advantage of the above-described attributes associated such an arrangement. In a preferred embodiment, the outer diameter of the screw member is three-eighths of an inch. The thread angle of the helically threaded screw member 10 is approximately 34° and the pitch radius helix angle is approximately 2.6193°. Further, the screw member 10 is a 20 pitch single lead screw. The thread angle of 34°, which results in a thread semi-angle of 17°, is chosen so that it is as small as possible while still satisfying the aforementioned requirements of no binding and no friction-locking.

The principles, preferred embodiments and modes of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others without departing from the spirit of the present invention. Accordingly, it is expressly intended that all such variations and changes which fall within the spirit and scope of the present invention as defined in the claims, be embraced thereby.

What is claimed is:

1. An apparatus for converting rotary motion to linear motion comprising:
    an externally threaded longitudinally extending screw member having a longitudinal axis and an outer diameter;
    at least one outer member concentrically positioned with respect to said screw member and surrounding a portion of the longitudinal extent of said screw member with an annular space being provided between an inner surface of the at least one outer member and an outer surface of the screw member, said at least one outer member having a plurality of spaced annular grooves located on the inner surface thereof, said at least one outer member having a longitudinal axis;
    a plurality of planet assemblies positioned within said annular space, each of said planet assemblies having a longitudinal axis and being comprised of at least one roller, each roller having a plurality of spaced annular grooves extending circumferentially around the exterior surface thereof, each pair of adjacent grooves defining an annular ridge therebetween which extends circumferentially around the exterior surface of the roller to thereby define a plurality of spaced annular ridges on each roller, each one of the majority of said ridges engaging the thread on said screw member and also engaging one of the grooves on the inner surface of said at least one outer member, the longitudinal axes of said screw member, said at least one outer member and said plurality of planet assemblies being parallel, the outer diameter of all of said planet assemblies being substantially equal and being at least equal to the outer diameter of said screw member.

2. An apparatus in accordance with claim 1, wherein each of said planet assemblies comprises coaxially positioned first and second rollers, the first and second rollers of each planet assembly having a plurality of said spaced annular grooves extending around the exterior surface thereof and also having a plurality of said spaced annular ridges extending around the exterior surface thereof, said at least one outer member comprising first and second separate outer members, both of said outer members having a plurality of spaced annular grooves extending around an inner surface thereof, the ridges on said first roller in each planet assembly engaging the grooves on the inner surface of said first outer member and the ridges on said second roller in each planet assembly engaging the grooves on the inner surface of said second outer member.

3. An apparatus in accordance with claim 2, further comprising an outer member holder concentrically positioned with respect to said screw member and said first and second outer members, said outer member holder having a helical thread on at least a portion of an interior surface thereof, said outer member holder encircling said first and second outer members so that said first and second outer members are positioned between said planet assemblies and said outer member holder.

4. An apparatus in accordance with Claim 3, wherein said first outer member is fixed with respect to said outer member holder and said second outer member has a helical thread on its exterior surface which engages the helical thread on the interior surface of said outer member holder whereby said second outer member is axially movable with respect to said outer holder member to thereby preload the second roller of each planet assembly.

5. An apparatus in accordance with claim 3, wherein the helical thread on the interior surface of the outer member holder extends along substantially the entire length of the outer member holder, said first outer member having a helical thread on its exterior surface that engages the helical thread on the interior surface of the outer member holder and said second outer member having a helical thread on its exterior surface that engages the helical thread on the interior surface of the outer member holder, whereby said first and second outer members are independently axially movable with respect to said outer member holder to thereby preload said first and second rollers respectively.

6. An apparatus in accordance with claim 1, further comprising a planet assembly carrier, said planet assembly carrier having a longitudinal bore extending through the center thereof from one face of the carrier to an opposite face of the carrier, said screw member and said planet assembly carrier being coaxial and said planet assembly carrier having a shape as viewed from one of said faces that is defined by a plurality of side surfaces, said planet assembly carrier having cut-out portions that extend from said side surfaces toward said longitudinal bore and that communicate with said longitudinal bore, said planet assembly carrier further having a plurality of flanges, one of said flanges extending on either side of each of said cut-out portions to thereby define pairs of oppositely positioned flanges, each of said flanges in each pair of oppositely positioned flanges having a hole therein, the hole in one flange of each pair of oppositely positioned flanges being coaxially aligned with the hole in the other flange in the same pair of oppositely positioned flanges, the longitudinal axis of each hole being parallel to the longitudinal axis of the bore.

7. An apparatus in accordance with claim 6, wherein said screw member extends through the longitudinal bore in said planet assembly carrier and wherein each of said planet carrier assemblies is rotatably mounted on a planet shaft, the number of planet assemblies being equal to the number of cut-out portions and each planet assembly being mounted in one of said cut-out portions and between a pair of oppositely positioned flanges such that said planet shaft extends through the coaxially aligned holes in said pair of oppositely positioned flanges.

8. An apparatus in accordance with claim 6, wherein said planet assembly carrier has three side surfaces that define a triangularly shaped planet assembly carrier when viewed from one of the faces of the planet assembly carrier, said triangularly shaped planet assembly carrier having three corners with one cut-out portion being located at each of the corners.

9. An apparatus in accordance with claim 1, wherein said plurality of planet assemblies comprises three planet assemblies and wherein said screw member has a single lead helical thread on its exterior surface, said three planet assemblies being axially staggered along the longitudinal extent of the screw member to define a leading planet assembly, a middle planet assembly and a trailing planet assembly, the inner surface of said at least one outer member being provided with at least three times as many grooves as there are total ridges on any one of said roller assemblies.

10. An apparatus in accordance with claim 9, wherein two centering washers are positioned on the planet shaft associated with the middle planet assembly only, one of said centering washers being positioned on the planet shaft at one end of the middle planet assembly and the other centering washer being positioned on the planet shaft at an opposite end of the middle planet assembly.

11. An apparatus in accordance with claim 1, wherein the outer diameter of each one of said planet assemblies is greater than the outer diameter of the screw member.

12. An apparatus in accordance with claim 1, wherein the ridges on each of the rollers are defined by side surfaces that taper towards each other and that define a first angle between each other, each of the annular grooves on said at least one outer member being defined by converging side surfaces that define a second angle between each other, the helical thread on said screw member having a thread angle that is substantially equal to said first and second angles.

13. An apparatus in accordance with claim 1, wherein each of said spaced annular ridges lies in a plane that is perpendicular to the longitudinal axis of the screw member, the planes in which each of said ridges of a particular roller lie being substantially parallel.

14. An apparatus in accordance with claim 1, wherein the screw member has a semi-thread angle that is less than twenty degrees.

15. An apparatus in accordance with claim 1, wherein the screw member has a semi-thread angle that is approximately equal to seventeen degrees.

* * * * *